UNITED STATES PATENT OFFICE.

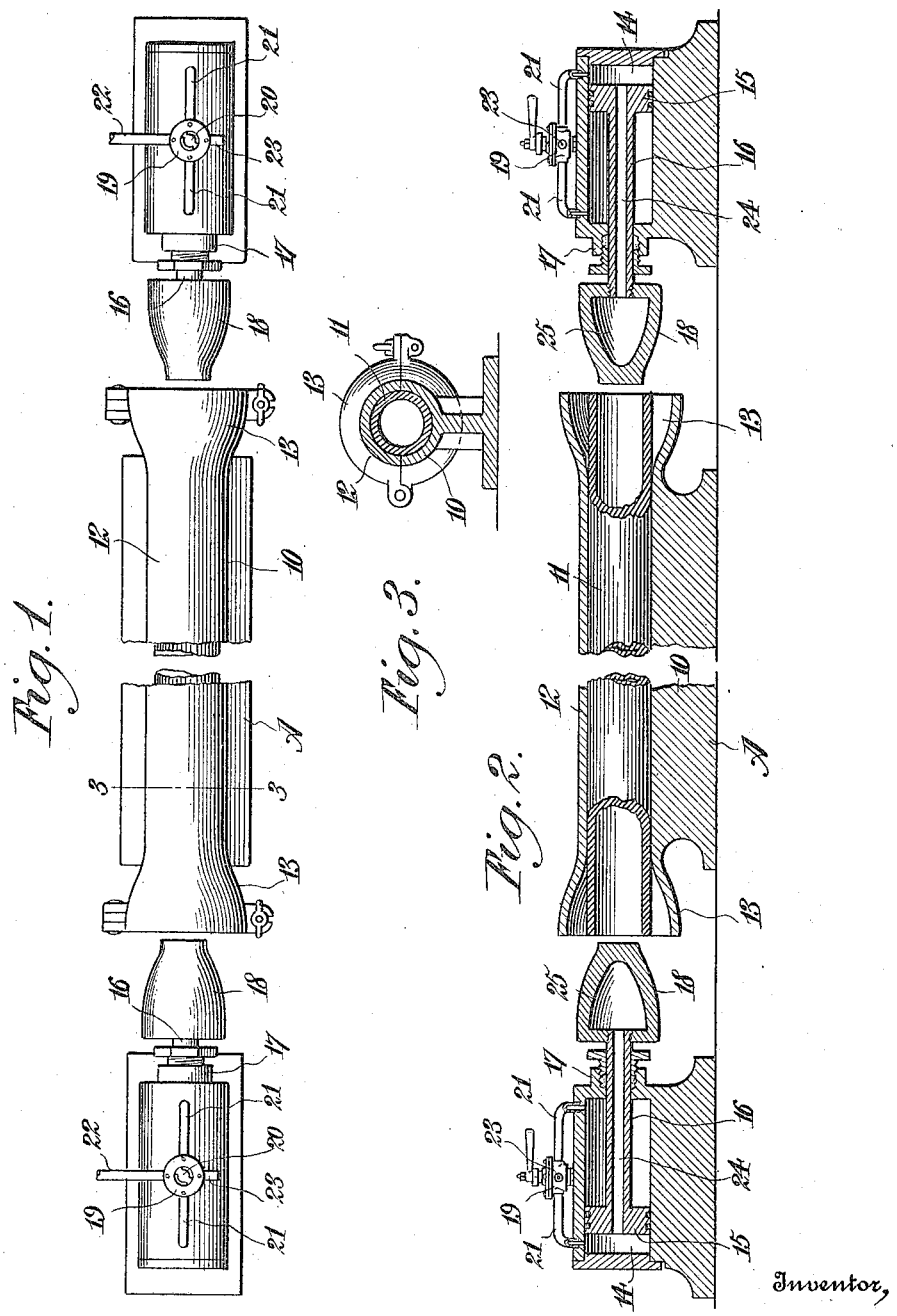

JAMES LAMB, OF YOUNGSTOWN, OHIO.

HOSE-BILLING PRESS.

1,128,156.

Specification of Letters Patent.

Patented Feb. 9, 1915.

Application filed February 18, 1914. Serial No. 819,600.

*To all whom it may concern:*

Be it known that I, JAMES LAMB, a citizen of the United States, residing at Youngstown, in the county of Mahoning and State of Ohio, have invented new and useful Improvements in Hose - Billing Presses, of which the following is a specification.

The invention relates to a hose billing press.

The primary object of the invention is the provision of a press wherein the ends of the hose for use in train pipe couplings will be enlarged at its ends so as to receive the metal parts of a coupling so as to avoid the possibility of the splitting of the ends of the hose when these parts are attached thereto.

Another object of the invention is the provision of a press of this character wherein the air hose is firmly held to enlarge the ends thereof under the action of fluid pressure without the possibility of bursting the hose or splitting the same during such operation.

A further object of the invention is the provision of a press of this character which is simple in construction, thoroughly reliable and efficient for the expanding of the air or steam hose at the ends thereof, and also which is inexpensive in manufacture.

With these and other objects in view, the invention consists in the construction, combination and arrangement of parts as will be hereinafter fully described, illustrated in the accompanying drawing, and pointed out in the claims hereunto appended.

In the drawing:—Figure 1 is a top plan view of a press constructed in accordance with the invention. Fig. 2 is a vertical longitudinal sectional view thereof. Fig. 3 is a sectional view on the line 3—3 of Fig. 1.

Similar reference characters indicate corresponding parts throughout the several views in the drawing.

Referring to the drawing in detail, the press comprises a hose clamping stand A formed with a tubular portion 10 in which is held the air or steam hose 11 which is made from rubber and vulcanized in the ordinary well-known manner, the tubular portion 10 being provided with a lid section 12 so that the hose can be readily inserted and removed from the same. Opposite ends of the tubular portion 10 are formed with flared caps 13 so as to permit the enlarging of the ends of the hose 11 in a manner presently described.

Spaced from opposite ends of the hose stand A are fluid cylinders 14 in each of which is arranged a reciprocating piston 15 having its rod 16 working through a stuffing box 17 in one end of the cylinder, and carrying a conical shaped expander head or bill 18, the same being detachably connected thereto in any suitable manner. This head or bill 18 is adapted to be passed within the end adjacent thereto of the hose 11 for expanding the same. Arranged on each cylinder 14 is a valve casing 19 fitted with a turn valve 20, and from this casing lead pipes 21 which communicate with the cylinder 14 near opposite ends thereof so that fluid may be admitted and exhausted from opposite sides of the piston 15 for reciprocatingly moving the same within the cylinder, it being understood of course that the valve casing 19 is connected with a fluid supply pipe 22 and an exhaust pipe 23 respectively. The valve 20 when actuated regulates the course of the supply fluid and the exhaust thereof to and from the cylinder so that the piston 15 will be actuated for moving the head or bill 18 into the end of the hose 11 and also for removing it therefrom.

The piston rod 16 is formed with a fluid passage 24 which communicates with the cylinder 14 and also opens into the fluid space 25 formed in the head or bill 18 so that steam from the cylinder 14 will flow into the space 25 for heating the head or bill 18, whereby it will be maintained heated for action on the hose to enlarge the ends thereof without possibility of the splitting or breaking of the hose during the operation of the press.

From the foregoing it is thought that the construction and manner of operation of the device will be clearly understood, and therefore a more extended explanation has been omitted.

What is claimed is:—

1. A press of the class described comprising a pair of spaced fluid cylinders, a reciprocating piston working within each cylinder and having a stem provided with a fluid vent opening through its outer end and communicating with the cylinders, a conical-shaped hollow member supported on the outer end of the stem and adapted to receive fluid from the cylinder, and means for holding a section of hose between the cylinders and in alinement with the member.

2. A press of the class described comprising a pair of spaced fluid cylinders, a reciprocating piston working within each cylinder and having a stem provided with a fluid vent opening through its outer end and communicating with the cylinders, a conical-shaped hollow member detachably supported on the outer end of the stem and adapted to receive fluid from the cylinder, and means for holding a section of hose between the cylinders and in alinement with the member.

3. A press of the class described comprising a pair of spaced fluid cylinders, a reciprocating piston working within each cylinder and having a stem provided with a fluid vent opening through its outer end and communicating with the cylinders, a conical-shaped hollow member detachably supported on the outer end of the stem and adapted to receive fluid from the cylinder, means for holding a section of hose between the cylinders and in alinement with the member, and means for admitting and exhausting fluid to and from the cylinders.

4. A press of the class described comprising a pair of spaced fluid cylinders, a reciprocating piston working within each cylinder and having a stem provided with a fluid vent opening through its outer end and communicating with the cylinders, a conical-shaped hollow member detachably supported on the outer end of the stem and adapted to receive fluid from the cylinders, means for holding a section of hose between the cylinders and in alinement with the member, means for admitting and exhausting fluid to and from the cylinders, and flared ends formed on the hose holder to embrace the hose when the members are inserted therein.

5. A press of the class described comprising a pair of spaced fluid cylinders, a reciprocating piston working within each cylinder and having a stem provided with a fluid vent opening through its outer end and communicating with the cylinders, a conical-shaped hollow member detachably supported on the outer end of the stem and adapted to receive fluid from the cylinders, means for holding a section of hose between the cylinders and in alinement with the member, means for admitting and exhausting fluid to and from the cylinders, and flared ends formed on the hose holder to embrace the hose when the members are inserted therein, and means for supporting the cylinders and holders.

6. A press of the class described comprising a pair of spaced fluid cylinders, a reciprocating piston working within each cylinder and having a stem provided with a fluid vent opening through its outer end and communicating with the cylinders, a conical-shaped hollow member detachably supported on the outer end of the stem and adapted to receive fluid from the cylinders, means for holding a section of hose between the cylinders and in alinement with the member, means for admitting and exhausting fluid to and from the cylinders, flared ends formed on the hose holder to embrace the hose when the members are inserted therein, means for supporting the cylinders and holders, and a swinging clamping section on the holder.

In testimony whereof I affix my signature in presence of two witnesses.

JAMES LAMB.

Witnesses:
W. J. WILLIAMS,
S. L. MULINEAUX.

Copies of this patent may be obtained for five cents each, by addressing the "Commissioner of Patents, Washington, D. C."